United States Patent
Madonna et al.

(10) Patent No.: US 10,802,668 B2
(45) Date of Patent: Oct. 13, 2020

(54) SMALL SCREEN VIRTUAL ROOM-BASED USER INTERFACE

(71) Applicant: Savant Systems, Inc., Hyannis, MA (US)

(72) Inventors: Robert P. Madonna, Osterville, MA (US); Michael C. Silva, East Sandwich, MA (US); Nicholas J. Cipollo, Boston, MA (US); Andrew Hamm, East Sandwich, MA (US); Teodor Lefter, Hyannis, MA (US)

(73) Assignee: Savant Systems, Inc., Hyannis, MA (US)

( * ) Notice: Subject to any disclaimer, the term of this patent is extended or adjusted under 35 U.S.C. 154(b) by 0 days.

(21) Appl. No.: 16/821,626

(22) Filed: Mar. 17, 2020

(65) Prior Publication Data

US 2020/0218427 A1   Jul. 9, 2020

Related U.S. Application Data

(63) Continuation of application No. 16/123,731, filed on Sep. 6, 2018, now Pat. No. 10,613,704, which is a
(Continued)

(51) Int. Cl.
*G06F 3/0481* (2013.01)
*G06T 1/20* (2006.01)
(Continued)

(52) U.S. Cl.
CPC ............ *G06F 3/04815* (2013.01); *G06F 3/00* (2013.01); *G06F 3/048* (2013.01); *G06F 3/0482* (2013.01);
(Continued)

(58) Field of Classification Search
CPC ......... G06F 3/04815; G06F 3/00; G06T 1/20; G06T 2200/28; H05B 47/175; H05B 47/19; H05B 47/155
See application file for complete search history.

(56) References Cited

U.S. PATENT DOCUMENTS 6,160,359 A   12/2000   Fleischmann
6,463,343 B1  10/2002   Emens et al.
(Continued)

FOREIGN PATENT DOCUMENTS

CN   102034341      4/2011
DE   100 12 508 A1  9/2001
(Continued)

OTHER PUBLICATIONS

"HomeRunner: User Manual," JDS Technologies, Feb. 2007, pp. 1-12.
(Continued)

*Primary Examiner* — Roland J Casillas
(74) *Attorney, Agent, or Firm* — Cesari and McKenna, LLP; James A. Blanchette

(57) ABSTRACT

In one embodiment, a virtual room-based user interface is provided. The interface displays a view of a virtual room that corresponds to a physical room and that includes a representation of a first device present in the physical room and at least one of a portion of structure of the physical room or a portion of furnishings present in the physical room. User input is received via the interface that indicates a change of state in the physical room. In response to the user input, a change is caused to a state provided by the first device, and the interface dynamically updates appearance of the virtual room to change appearance of the representation of the first device and at least one of the portion of the structure of the
(Continued)

physical room or the portion of the furnishings present in the physical room to reflect the change to the state.

20 Claims, 6 Drawing Sheets

Related U.S. Application Data continuation-in-part of application No. 14/190,984, filed on Feb. 26, 2014, which is a continuation-in-part of application No. 13/551,289, filed on Jul. 17, 2012, now Pat. No. 9,055,627, which is a continuation of application No. 12/792,236, filed on Jun. 2, 2010, now Pat. No. 8,296,669, said application No. 16/123,731 is a continuation-in-part of application No. 14/733,428, filed on Jun. 8, 2015, now Pat. No. 10,146,398, which is a continuation of application No. 13/551,289, filed on Jul. 17, 2012, now Pat. No. 9,055,627, which is a continuation of application No. 12/792,236, filed on Jun. 2, 2010, now Pat. No. 8,296,669.

(60) Provisional application No. 62/555,038, filed on Sep. 6, 2017, provisional application No. 61/183,825, filed on Jun. 3, 2009.

(51) Int. Cl.
  *G06F 3/0484* (2013.01)
  *G06F 3/0482* (2013.01)
  *G06F 3/00* (2006.01)
  *H05B 47/19* (2020.01)
  *H05B 47/155* (2020.01)
  *H05B 47/175* (2020.01)
  *G06F 3/048* (2013.01)

(52) U.S. Cl.
  CPC ...... *G06F 3/04842* (2013.01); *G06F 3/04845* (2013.01); *G06F 3/04847* (2013.01); *G06T 1/20* (2013.01); *H05B 47/155* (2020.01); *H05B 47/175* (2020.01); *H05B 47/19* (2020.01); *G06T 2200/28* (2013.01)

(56) References Cited

U.S. PATENT DOCUMENTS

| | | | |
|---|---|---|---|
| 6,756,998 | B1 | 6/2004 | Bliger |
| 7,047,092 | B2 | 5/2006 | Wimsatt |
| 7,061,488 | B2 | 6/2006 | Randel |
| 7,167,777 | B2 | 1/2007 | Budike, Jr. |
| 7,529,838 | B2 | 5/2009 | Primm et al. |
| 7,760,107 | B1 | 7/2010 | Stepps et al. |
| RE42,289 | E | 4/2011 | Vincent |
| 8,042,049 | B2 | 10/2011 | Killian et al. |
| 8,122,131 | B2 | 2/2012 | Baum et al. |
| 8,296,669 | B2 | 10/2012 | Madonna et al. |
| 8,352,079 | B2 | 1/2013 | Wendt |
| 9,055,627 | B2 | 6/2015 | Madonna et al. |
| 2002/0067355 | A1 | 6/2002 | Randel |
| 2004/0160199 | A1 | 8/2004 | Morgan et al. |
| 2004/0260427 | A1 | 12/2004 | Wimsatt |
| 2005/0097478 | A1 | 5/2005 | Killian et al. |
| 2006/0098112 | A1 | 5/2006 | Kelly |
| 2007/0171091 | A1 | 7/2007 | Nisenboim et al. |
| 2007/0265121 | A1 | 11/2007 | Gross |
| 2007/0268121 | A1 | 11/2007 | Vasefi et al. |
| 2007/0288849 | A1 | 12/2007 | Moorer et al. |
| 2008/0127063 | A1 | 5/2008 | Silva et al. |
| 2008/0200205 | A1 | 8/2008 | Liu et al. |
| 2008/0265797 | A1 | 10/2008 | Van Doorn |
| 2008/0270937 | A1 | 10/2008 | Poulet et al. |
| 2009/0066534 | A1 | 3/2009 | Sivakkolundhu |
| 2009/0083634 | A1 | 3/2009 | Madonna et al. |
| 2009/0303197 | A1 | 12/2009 | Bonczek et al. |
| 2010/0157018 | A1 | 6/2010 | Lampotang et al. |
| 2010/0164878 | A1 | 7/2010 | Bestle et al. |
| 2010/0185969 | A1 | 7/2010 | Wendt et al. |
| 2010/0211897 | A1 | 8/2010 | Cohen et al. |
| 2010/0277107 | A1 | 11/2010 | Baaijens et al. |
| 2011/0273114 | A1 | 11/2011 | Ogg et al. |
| 2012/0084472 | A1 | 4/2012 | Locascio et al. |
| 2012/0284672 | A1 | 11/2012 | Madonna et al. |
| 2014/0181704 | A1 | 6/2014 | Madonna et al. |
| 2015/0301716 | A1 | 10/2015 | Madonna et al. |
| 2016/0120009 | A1 | 4/2016 | Aliakseyeu et al. |
| 2019/0004677 | A1 | 1/2019 | Madonna et al. |

FOREIGN PATENT DOCUMENTS

| | | | |
|---|---|---|---|
| DE | 10314134 | A1 | 10/2003 |
| EP | 1986474 | A2 | 10/2008 |
| JP | H07-073978 | | 8/1993 |
| JP | 2002-245102 | | 2/2001 |
| JP | 2012-529147 | | 11/2012 |
| WO | WO-2002/099780 | A2 | 12/2002 |
| WO | WO-2002-103841 | A1 | 12/2002 |
| WO | WO-2009/004531 | A1 | 1/2009 |
| WO | WO-2009-061014 | A1 | 5/2009 |
| WO | WO-2010/141076 | A1 | 12/2010 |
| WO | WO-2013/137191 | | 9/2013 |

OTHER PUBLICATIONS

"Pocket WebX: Installation and Operation Manual," JDS Technologies, Feb. 2004, pp. 1-12.
"Notification of Transmittal of the International Search Report and the Written Opinion of the International Searching Authority, or the Declaration," International Filing Date: Jun. 2, 2010, International Application No. PCT/US2010/001600, Applicant: Savant Systems, LLC. , dated Sep. 3, 2010, pp. 1-14.
"Notification of Transmittal of the International Search Report and the Written Opinion of the International Searching Authority, or the Declaration," International Filing Date: Feb. 12, 2015, International Application No. PCT/US2015/015628, Applicant: Savant Systems, LLC, dated Apr. 29, 2015, pp. 1-9.
"Notification of Transmittal of the International Search Report and the Written Opinion of the International Searching Authority, or the Declaration," International Filing Date: Sep. 6, 2018, International Application No. PCT/US2018/049712, Applicant: Savant Systems, LLC, dated Nov. 28, 2018, pp. 1-14.
U.S. Appl. No. 13/551,289, filed Jul. 17, 2012 by Robert P. Madonna, et al. for a Virtual Room-Based Light Fixture and Device Control, 1-50.

SMALL SCREEN VIRTUAL ROOM-BASED USER INTERFACE

RELATED APPLICATIONS

The present application is a continuation of U.S. patent application Ser. No. 16/123,731, which was filed on Sep. 6, 2018, by Robert P. Madonna et al for SMALL SCREEN VIRTUAL ROOM-BASED USER INTERFACE.

U.S. patent application Ser. No. 16/123,731 claims the benefit of U.S. Provisional Patent Application Ser. No. 62/555,038, which was filed on Sep. 6, 2017, by Robert P. Madonna et al for SMALL SCREEN VIRTUAL ROOM-BASED USER INTERFACE.

U.S. patent application Ser. No. 16/123,731 is also a continuation-in-part of U.S. patent application Ser. No. 14/190,984, filed Feb. 26, 2014 by Robert P. Madonna et al., entitled "User Generated Virtual Room-Based User Interface", which is a continuation-in-part of U.S. patent application Ser. No. 13/551,289, filed Jul. 17, 2012 by Robert P. Madonna et al., entitled "Virtual Room-Based Light Fixture and Device Control," now issued as U.S. Pat. No. 9,055,627, which is itself a continuation of U.S. patent application Ser. No. 12/792,236, filed on Jun. 2, 2010 by Robert P. Madonna et al., and entitled "Virtual Room-Based Light Fixture and Device Control," now issued as U.S. Pat. No. 8,296,669, which claims the benefit of U.S. Provisional Patent Application Ser. No. 61/183,825, filed Jun. 3, 2009 by Robert P. Madonna et al., entitled "Virtual Room-Based Light Fixture and Device Control."

U.S. patent application Ser. No. 16/123,731 is also a continuation-in-part of U.S. patent application Ser. No. 14/733,428, filed on Jun. 8, 2015 by Robert P. Madonna et al., entitled "Generating a Virtual-Room of a Virtual Room-Based User Interface," now issued as U.S. Pat. No. 10,146,398, which is a continuation of U.S. patent application Ser. No. 13/551,289, filed on Jul. 17, 2012 by Robert P. Madonna et al., and entitled "Virtual Room-Based Light Fixture and Device Control", now issued as U.S. Pat. No. 9,055,627, which is a continuation of U.S. patent application Ser. No. 12/792,236, filed on Jun. 2, 2010 by Robert P. Madonna et al., entitled "Virtual Room-Based Light Fixture and Device Control," now issued as U.S. Pat. No. 8,296,669, which claims the benefit of U.S. Provisional Patent Application Ser. No. 61/183,825, filed on Jun. 3, 2009 by Robert P. Madonna, and entitled "Virtual Room-Based Light Fixture and Device Control."

All of the above listed patent applications and patents are incorporated by reference herein in their entirety.

BACKGROUND

Technical Field

The present disclosure relates generally to device control and more specifically a user interface to control devices in a home automation system.

Background Information

As homes and other structures become larger, and become filled with more devices, device control becomes an increasing challenge. Traditionally, many devices have been controlled by mechanical switches. While mechanical switches are reliable and cost-effective, they have many limitations, especially when there are many devices located in the same room of a structure. For example, a large room may include a large number of lighting devices, security devices, heating ventilation and air conditioning (HVAC) devices, audio/video (A/V) devices, etc. To control all these devices, a large number of mechanical switches may be needed. As the number of mechanical switches increases within the room, usability decreases. Mechanical switches often are unlabeled, or if labeled, marked with only cryptic descriptions (e.g., "Lamp 1", "Lamp 2", etc.). A user may be forced to memorize which of the many mechanical switches available in the room controls which device. A new guest in the room, who has not memorized this relationship, typically must rely upon trial and error to determine which mechanical switch controls which device, flipping switches until they happen upon the result they desire.

A variety of types of home automation and electronic device control systems have been developed that attempt to improve upon the shortcomings of mechanical switches. Such systems typically include one or more controllers that manage the operation of devices. The controllers may be interacted with via user interface devices, such as dedicated touch screen units, that provide a user interface for controlling the devices. The user interface may include an array of touch-sensitive buttons, where each button controls a device or a group of devices.

However, such button-centric on-screen user interfaces share many of the same shortcomings as mechanical switches. While the buttons are shown on a screen, rather than existing as physical objects like mechanical switches, they operate very similarly. By looking at an on-screen button, it may not be apparent what the button does. While a label may be provided, often such labels are short and cryptic, given the constraints of screen space. A new guest to a room, similar to the case with mechanical switches, may have to touch each on-screen button to discover by trial and error what button achieves what result.

Recently, a device control solution has been developed that addresses many of the shortcomings of mechanical switches and button-centric on-screen user interfaces. This solution provides a user interface that includes one or more virtual rooms displayed on a touch screen. By touching a representation of a device within a virtual room shown on the screen, a user may indicate a state change for the device.

However, while this type of solution solves many of the shortcomings of mechanical switches and button-centric on-screen user interfaces, it presents new challenges. One challenge is how to present such an interface on a "small screen", for example, the screen of a handheld remote control, mobile device, or "small" dedicated touch screen unit (e.g., an in-wall 1-gang touch screen unit, a wall-mounted unit, etc.). When such an interface is shown on a "small screen", individual representations of devices may be exceedingly small. This may hinder users from locating and recognizing representations of devices. Further, even if a user can locate and recognize the tiny representations of devices, they may be unable to touch a specific one without their finger inadvertently overlapping one or more representations of other devices, and potentially causing unwanted state changes. Accordingly, the usability of such interfaces on "small screens" has been limited.

Accordingly, there is a need for an improved user interface that may be better suited for use on a "small screen," for example, the screen of a hand held remote control, mobile device or dedicated touch screen unit.

SUMMARY

In one embodiment, a virtual room-based user interface suited for use on a "small screen" is provided that organizes representations of devices in a virtual room into a sequence, allows a user to cycle through the representations of devices in the sequence so only a single one is selected at any given time, and individually controls the device corresponding to the selected representation using a designated control region separate from the selected device.

Specifically, in one embodiment, a remote control, mobile device or dedicated touch screen unit (e.g., an in-wall 1-gang touch screen unit, a wall mounted unit, etc.), displays a virtual room that corresponds to a physical room on a touch screen display. The virtual room includes representations of devices that correspond to devices in the physical room, representations of boundaries of the physical room, and representations of furnishings present in the physical room. The representations of devices are organized into a sequence, and initially a representation of a first device is selected (e.g., by default) from the sequence. The remote control, mobile device or dedicated touch screen unit displays on the touch screen display an indication of the selected representation of the first device, and a designated control region separate from the selected representation of the first device. In response to receiving user input in the designated control region indicating a change of state, the remote control, mobile device or dedicated touch screen unit communicates with and causes a change to a state of a service provided by the first device, and updates the appearance of the virtual room to change appearance of the selected representation of the first device, appearance of the representations of boundaries and appearance of the representations of furnishings, to reflect the changed state of the service provided by the first device.

Subsequently, in response to user input (e.g., a swipe gesture), a successive representation in the sequence may be selected that corresponds to a second device in the physical room. The remote control, mobile device or dedicated touch screen unit updates the indication of the selected representation. In response to further user input in the designated control region, the remote control, mobile device or dedicated touch screen unit causes a change to a state of a service provided by the second device, and dynamically updates appearance of the virtual room to change appearance of the representation of the second device, appearance of the representations of boundaries and appearance of the representations of furnishings, to reflect the changed state of the service provided by the second device.

It should be understood that a variety of additional features and alternative embodiments may be implemented. This Summary is intended simply as an introduction to the reader, and does not indicate or imply that the examples mentioned herein cover all aspects of the invention, or are necessary or essential aspects of the invention.

BRIEF DESCRIPTION OF THE DRAWINGS

The description below refers to the accompanying drawings, of which.

DETAILED DESCRIPTION

Definitions

As used herein, the term "home automation system" should be interpreted broadly to encompass various types of home control, "smart home", and/or device control systems that may control devices (e.g., lighting devices, security devices, A/V devices, HVAC devices, electronic door locks, and/or other types of devices) within a structure, such as a residential dwelling or commercial building. A home automation system may control a variety of different types of devices, or devices of only a particular type (e.g., only lighting devices, only A/V devices, etc.).

As used herein, the term "mobile device" refers to an electronic device that executes a general-purpose operating system and is adapted to be transported on one's person. Devices such as smartphones should be considered mobile devices. Desktop computers, servers, or other primarily-stationary computing devices generally should not be considered mobile devices.

As used herein, the term "remote control" refers to a portable electronic device that includes specially adapted hardware (e.g., specially labeled buttons) for use in controlling a home automation system, or one or more devices of a home automation system. General purpose mobile devices, such as smartphones, should not be considered remote controls.

As used herein, the term "dedicated touch screen unit" refers to an in-wall, wall mounted or tabletop electronic device that includes specially adapted hardware for use in controlling a home automation system or one or more devices of a home automation system. A dedicated touch screen unit may have a form-factor of limited size, for example, sized to fit in a standard 1-gang switch box, a standard 2-gang switch box, etc.

As use herein, the term "service" refers to an effect or activity offered by a home automation system that involves one or more devices of a home automation system. An example of a service may be lighting service that provides an illumination effect or a cable TV service that provides a cable television viewing activity.

As use herein, the term "physical room" refers to an interior portion of a physical structure or an exterior space associated with a physical structure, in which one or more services may be provided.

As user herein, the term "virtual room" refers to a digital twin of a physical room that is represented by a depiction of an interior portion of a physical structure or an exterior space associated with a physical structure. The depiction may include representations of boundaries of the physical room, representations of furnishings present in the physical room, and representations of devices present in the physical room. The representations of the devices are preferably shown at locations within the virtual room corresponding to the device's actual locations within the physical room.

An Example Home Automation System

Figure 1:
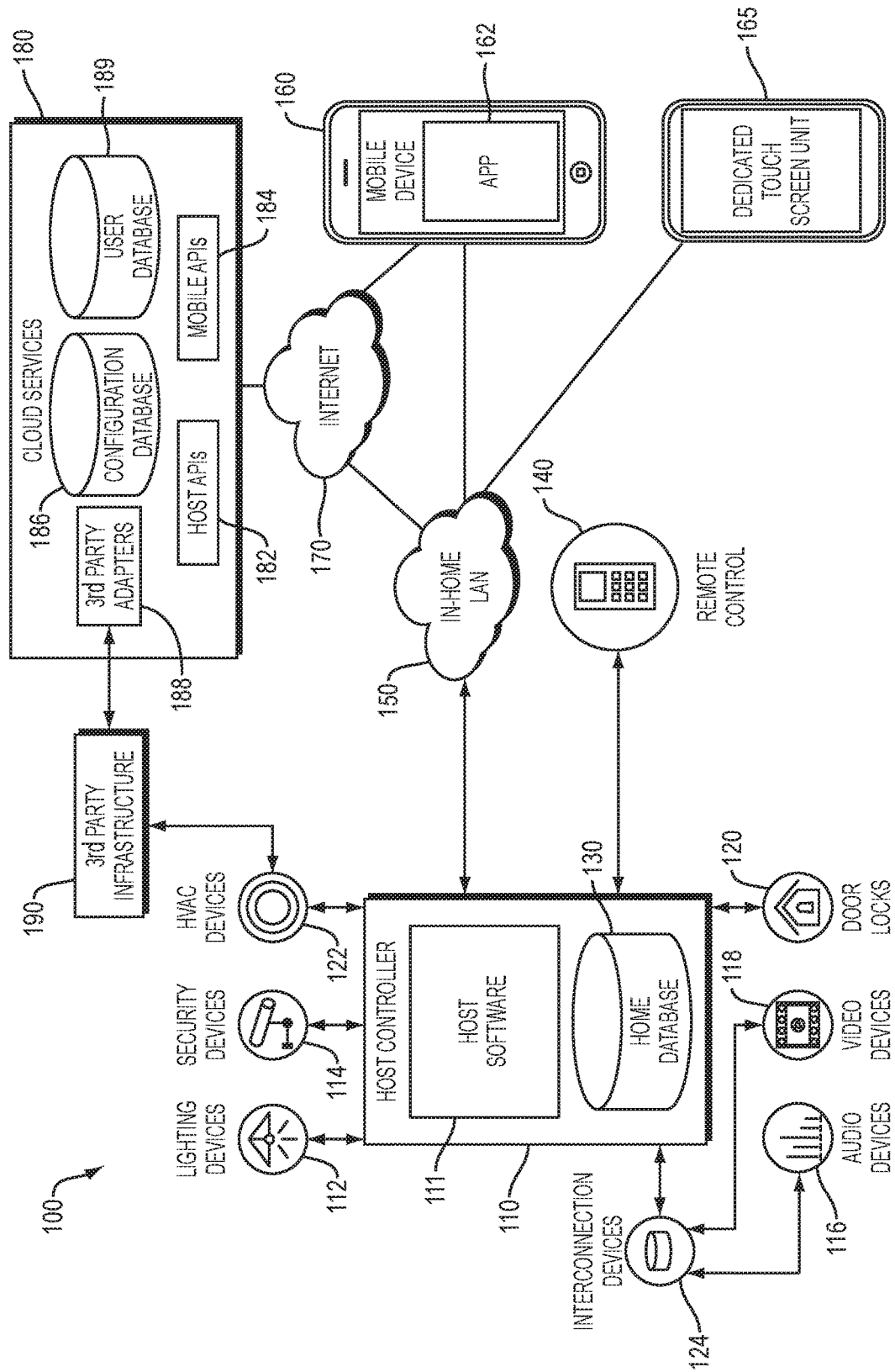
FIG. 1 is a block diagram of an example architecture of a home automation system operable to control devices in rooms of a structure (e.g., a residential dwelling or commercial building)

FIG. 1 is a block diagram of an example architecture 100 of a home automation system operable to control devices in rooms of a structure (e.g., a residential dwelling or commercial building). At the core of the system is a host controller 110 coupled to an in-home local area network (LAN) (e.g., a Wi-Fi network) 150. The host controller may include hardware components such as a processor, a memory and a storage device, which collectively store and execute host software 111 configured to monitor the control the operations of devices 112-124, as well as to provide UI interpretation, system administration and monitoring, synchronization with cloud services 180 and mobile devices 160, activity recording, activity prediction and other types of functionality.

The host controller 110 may maintain in its storage device a home database 130 that stores configuration information including information regarding devices controlled by the home automation system and services the home automation system is configured to provide using such devices.

The devices 112-124 of the home automation system may include lighting devices 112, such as light fixtures lamp modules, dimmer modules, and the like; security devices 114, such as home monitors/cameras, motion sensors, home healthcare sensors, related controllers and the like; audio devices 116 and video devices 118 (collectively A/V devices), such as A/V device controllers, media servers, audio amplifiers, cable boxes, and the like; electronic door locks 120 and other types of motor or relay operated devices; HVAC devices 122, such as thermostats; interconnection devices 124, such as IR blasters, matrix switchers, signal extenders and the like, as well as other types of home automation system devices. Each of the devices 112-124 may be associated with (i.e. configured to be used in connection with) a room. The devices 112-124 may physically reside in the room with which they are associated or reside elsewhere (e.g., a remote equipment rack).

Depending on the implementation, the communications capabilities of the devices 112-124 of the home automation system may vary. For example, at least some of the devices may include both a LAN interface (e.g., a Wi-Fi adaptor) to enable them to communicate with the host controller 110 and other devices via the in-home LAN 150 (e.g., Wi-Fi), or a wireless personal area network (WPAN) interface (e.g., a BLE adaptor) to enable them to communicate with the host controller 110 and other devices via a WLAN (not shown). Likewise, some devices may only have ports or transceivers for wired or point-to-point wireless communication (e.g., RS-232, relay or general-purpose input/output (GPIO) ports, infrared (IR) transceivers, etc.) and communicate with the host controller 110 and other devices using such ports. Some of the devices (e.g., an interconnection device such as an IR blaster) may include both a WPAN interface (e.g., a BLE adaptor) to enable them to communicate with the host controller 110 and a point-to-point wireless transceiver (e.g., an IR transceiver) for communicating with other devices (e.g., A/V devices 116, 118) of the home automation system. Further, some devices may include a LAN interface (e.g., a Wi-Fi interface), but not be configured to communicate with the host controller 110 directly over the in-home LAN 150, but instead communicate via Internet 170, cloud services 180 and third party infrastructure 190. It should be understood that while HVAC devices 122 are shown in FIG. 1 as an example of one type of device that may communicate in this manner, other types of devices 112-124 may alternatively use this method of communication, and vice versa.

A user may control the home automation system using a remote control 140 that communicates with the host controller 110 through the in-home LAN 150 (e.g., via Wi-Fi) or directly with the host controller 110 via point-to-point wireless signals (e.g. via IR or radio frequency RF signals). The remote control 140 may include a small touch screen display (e.g., less than 7 inches on diagonal, for example 2.95 inches on diagonal), physical buttons, and a processor, memory and storage device that store and execute control software configured to interface with the host controller 110 and cloud services 180. The control software may present a virtual-room based user interface for controlling the home automation system, among other functionality.

A user may also control the home automation system using a mobile device 160 that communicates with the host controller 110 via the in-home LAN 150 or using a mobile data connection to the Internet 170. The mobile device 160 may include a small touch screen display (e.g., less than 7 inches on diagonal, for example 5.5 inches on diagonal), and a processor, a memory and a storage device that store and execute an application (app) 162 (e.g., a mobile app) configured to interface with the host controller 110 and/or cloud services 180, that may present a virtual-room based user interface for controlling the home automation system, among other functionality.

Still further, a user may control the home automation system using a dedicated touch screen unit 165 (e.g., an in-wall 1-gang touch screen unit, a wall mounted unit, etc.) that communicates with the host controller 110 via the in-home LAN 150. The dedicated touch screen unit 165 may include a small touch screen display, and a processor, a memory and a storage device that store and execute software configured to interface with the host controller 110 and/or cloud services 180, that may present a virtual-room based user interface for controlling the home automation system, among other functionality.

Devices may communicate via the Internet 170 with cloud services 180 and its host application program interfaces (APIs) 182 and mobile APIs 184. The cloud services 180 may provide remote access to home automation control, a persistent backup of the home database 130 (storing data in a configuration database 186), interfaces to third party infrastructure (via third party adaptors 188), user profiles and usage tracking (storing data in user database 189), a mechanism for over-the-air updates, host crash reporting, and license management, among other functions.

A Virtual Room Based User Interface Generally

The software on the remote control 140, the app 162 on the mobile device 160 or the software on the dedicated touch screen unit 165 may present a virtual room-based user interface for controlling the home automation system 100, which includes one or more virtual rooms that each show a photo-realistic depiction of a corresponding physical room of the structure. The photo-realistic depiction may show photo-realistic representations of boundaries of the physical room (e.g., the walls, ceiling, floor, etc.), photo-realistic representations of furnishings present in the physical room (e.g., sofas, chairs, beds, wall-hangings, etc.), and photo-realistic representations of devices present in the physical room (e.g., lighting devices, security devices, A/V devices, HVAC devices and/or other types of devices). The representations of the devices are preferably shown at locations within the virtual room corresponding to the de-vice's actual locations within the physical room. The virtual room operates as an interface environment. By interacting with the virtual room, a user may indicate changes to the state of services provided by the corresponding devices in the physical room. As the state of devices is changed so they provide different services within the physical room, the appearance of the virtual room is dynamically updated to reflect the changes. Such update may change the appearance of the representations of devices, as well as the appearance of the representations of boundaries and the appearance of the representations of furnishings (e.g., with photo-realistic changes to shadows, reflections, etc.). In such manner, the virtual room is updated to reflect back to the user a photo-realistic depiction of the present condition of the corresponding physical room, such that what a user views within the virtual room will mirror, or at least resemble, their experience within the corresponding physical room. Such an interface may be highly intuitive, allowing a user to readily indicate control selections without having to understand complicated control schemes.

Operation of a Traditional "Large Screen" Virtual Room Based User Interface

Figure 2:
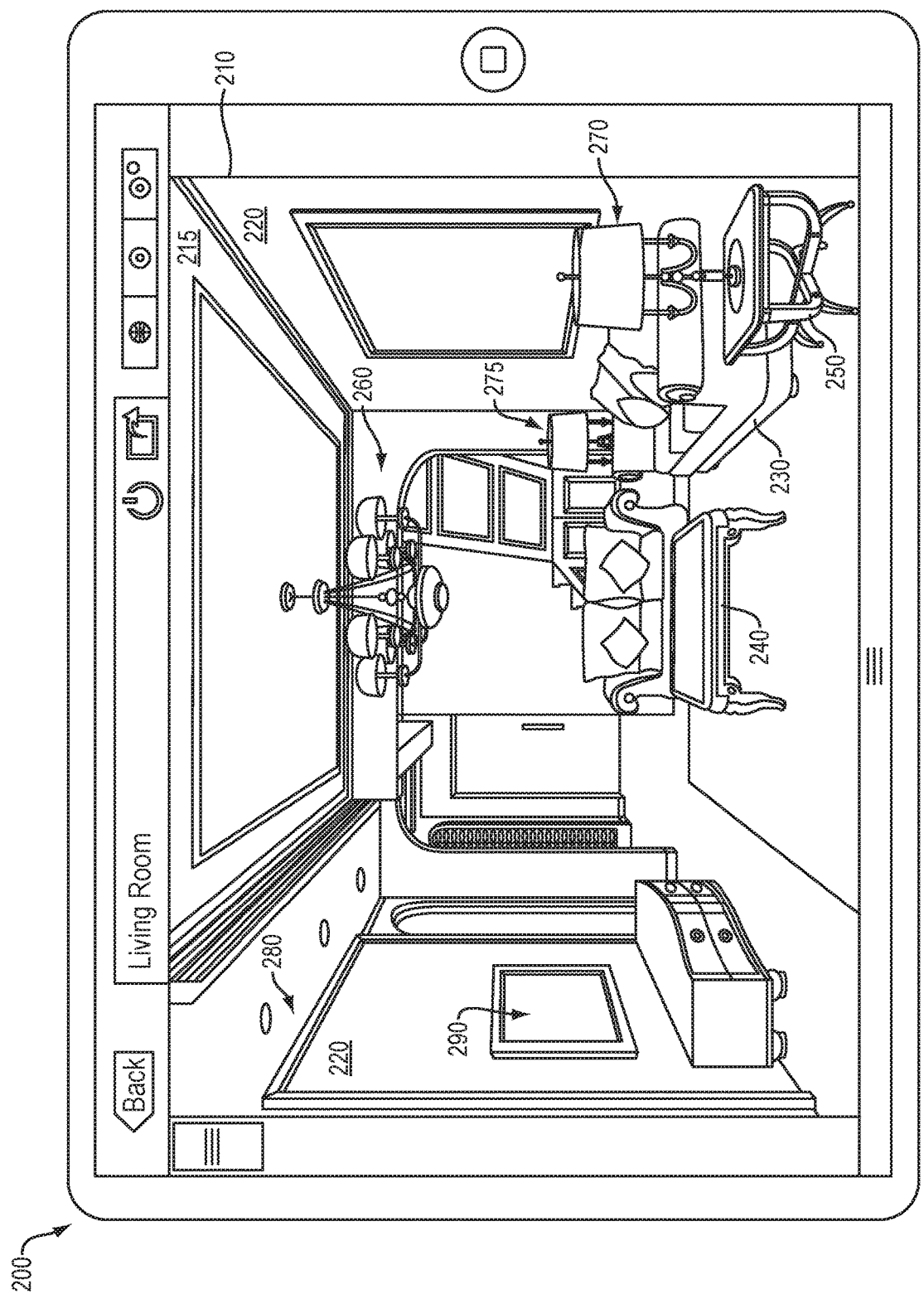
FIG. 2 is a view of an example tablet computer showing on a touch screen display thereof an example virtual room of an example "large screen" virtual room-based user interface.

In a traditional virtual room based user interface adapted for use on a "large screen" (e.g., greater than 7 inches on diagonal), a user may indicate a change to the state of a service provided by a device in the physical room by touching upon the representation of the device in the physical room. For example, the user may touch a representation of a lighting device to activate the lighting device, changing the state of a lighting service. FIG. 2 is a view 200 of an example tablet computer showing on a touch screen display thereof an example virtual room 210 of an example "large screen" virtual room-based user interface. The example virtual room 210 corresponds to a living room within an example home. However, it should be understood that such choice of room for this example is arbitrary. The example virtual room 210 includes photo-realistic representations of boundaries of the physical room, such as the ceiling 215 and walls 220; photo-realistic representations of furnishings present in the physical room, such as a sofa 230, coffee table 240, and end table 250; as well as photo-realistic representations of controllable devices within the physical room, such as a chandelier 260, table lamps 270, 275, recessed cans 280, and a television 290. Each of these devices provides a service having states (e.g., an active state, an inactive state, and some cases a plurality of active sub-states). For example, the chandelier, table lamps, and recessed cans provide a lighting service that includes an active state of "on" (and potentially a plurality of active sub-states representing different illumination levels and/or illumination colors), and an inactive state of "off". Similarly, the television provides a viewing service that includes an active state of "on" (and potentially a plurality of active sub-states representing different video sources, channels, volume levels, etc. being displayed/used), and an inactive state of the television being "off".

By touching the photo-realistic representation of the devices 260-290 within the virtual room 210, a user indicates changes to the state of the services provided by the corresponding devices in the corresponding physical room, that are implemented by the home automation system. For example, by touching the photo-realistic depiction of the chandelier 260, the user may cause the chandelier within the physical room to be illuminated (or otherwise controlled). Similarly, by touching the photo-realistic depiction of the television 290, the user may cause the television within the physical room to be powered on (or otherwise controlled).

As the devices provide different services, the appearance of the virtual room 210 is dynamically updated to reflect the changes. For example, when the chandelier is turned on, the photo-realistic representation of the chandelier 260 within the virtual room 210 is changed to represent the chandelier in an illuminated state. Such change may be accompanied by changes to the representations of boundaries and furnishings, to show shadows, reflections and other effects of the illumination from the chandelier. Similarly, when the television is powered on, the photo-realistic depiction of the television 290 within the virtual room 210 is changed to depict the television in a powered on state. Such change is accompanied by changes to the representations of boundaries and furnishings, to show reflections and other effects of the television screen emitting light. In this manner, the virtual room 210 may mirror, or at least resemble, the present appearance of the physical room.

While such an arrangement may work well on a "large screen", as discussed above, when the screen size is decreased it may be difficult for a user to recognize representations of devices that may be touched. For example, referring to FIG. 2, the representation of lamp 275 may become so small that it is not even noticeable in the interface. Further, even if a user can locate tiny representations of devices in the interface, they may be unable to touch a specific one without their finger inadvertently toughing another. For example, the representation of lamp 270 and the representation of lamp 275 may be so close together that a user's finger covers at least a portion of both, such that a desired one cannot be reliably selected.

Operation of a "Small Screen" Virtual Room Based User Interface

In a virtual room based user interface adapted for use on a "small screen" (e.g., less than 7 inches), photo-realistic representations of devices may be organized into a sequence (e.g., a sequential loop). A particular photo-realistic representation of a device from the sequence may be selected by default when the virtual room is first displayed. The interface may show an indication of the device corresponding to the selected photo-realistic representation (e.g., a text label) and provide a control region for changing a state of a service provided by the device. The control region may take the form of a slider, button or other element separate from the selected photo-realistic representation (e.g., at the bottom of the user interface). In response to user input (e.g., touch) in the designated control region, the home automation system 100 (or more specifically, the host controller 110 thereof) changes the state of the service provided by the device in the physical room. The appearance of the virtual room is dynamically updated to reflect the change. Such updating may change the appearance of the selected photo-realistic representation of a device to indicate the changed state of the service, as well as change the appearance of the representations of boundaries and the appearance of the representations of furnishings (e.g., with photo-realistic changes to shadows, reflections, etc.).

In response to further user input in the interface (e.g., a touch gesture, such as a forward swipe gesture), a successive photo-realistic representation in the sequence may be selected. The indication of the device is updated to reflect the newly selected photo-realistic representation (e.g., the text label is updated). A new device in the physical room then becomes the subject of control in the virtual room based user interface. In response to user input (e.g., touch) in the designated control region, the home automation system 100 (or more specifically, the host controller 110 thereof) changes the state of the service provided by the new device in the physical room. Again, the appearance of the virtual room is dynamically updated to reflect the change. Such updating may change the appearance of the newly selected photo-realistic representation to indicate the changed state of the service, as well as change the appearance of the representations of boundaries and the appearance of the representations of furnishings (e.g., with photo-realistic changes to shadows, reflections, etc.). A user may advance further through the sequence of photo-realistic representations of devices (in some cases eventually looping back to the beginning) by entering further input in the interface (e.g., a further forward swipe gesture), or may move back in the sequence of photo-realistic representations of devices by entering input in the interface (e.g., a backward swipe gesture). Since device selection does not rely on touching individual representations of devices in the virtual room, the interface may be better adapted for display on a "small screen."

Figure 3:
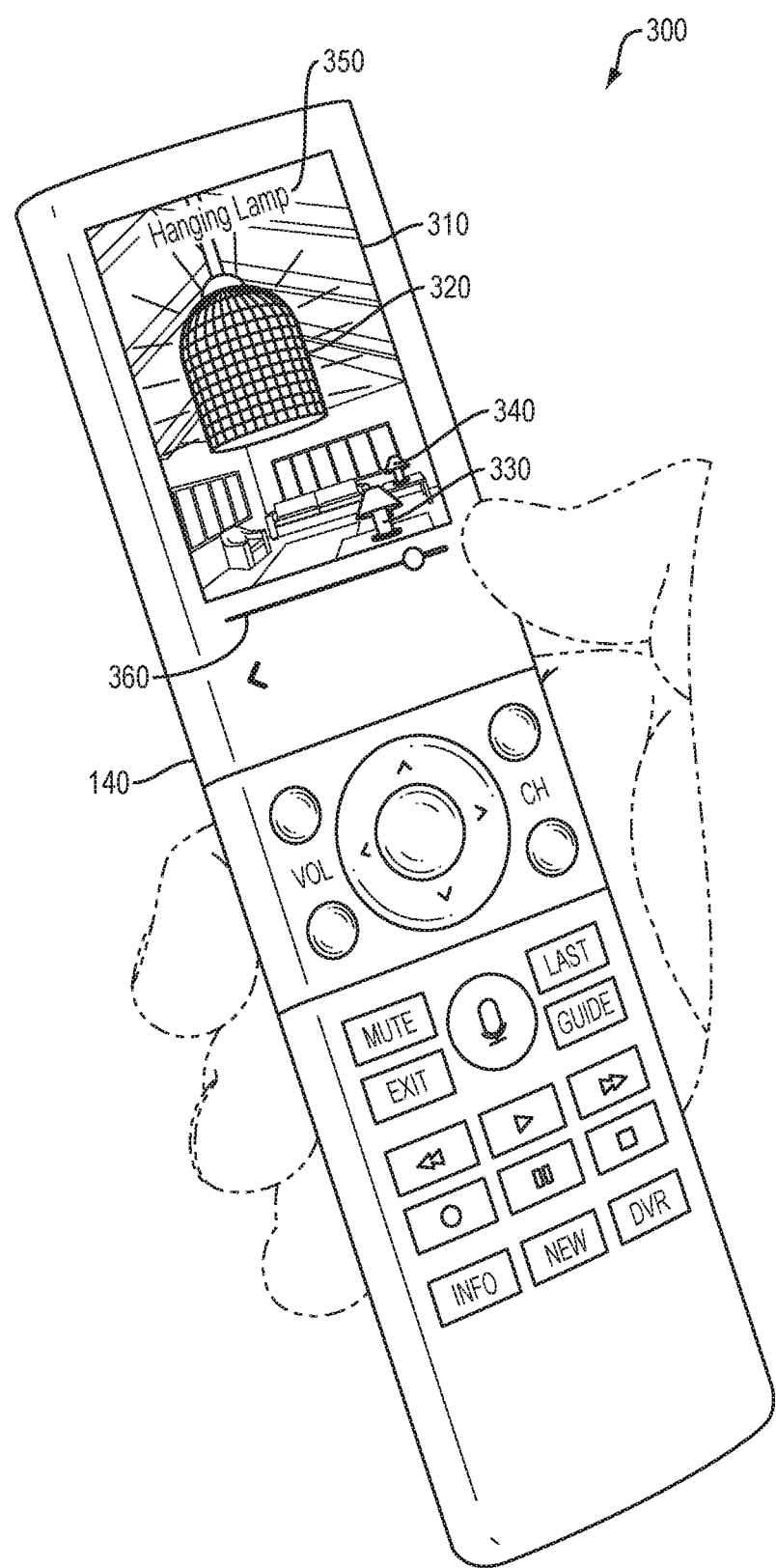
FIG. 3 is a view of an example remote control showing on a touch screen display thereof an example virtual room of an example virtual room-based user interface.

FIG. 3 is a view 300 of an example remote control 140 showing on a touch screen display thereof an example virtual room 310 of an example virtual room-based user interface. The example virtual room 310 corresponds to a great room within an example home. However, it should be understood that such choice of room for this example is arbitrary. The example virtual room 310 includes photo-realistic representations of boundaries of the physical room, photo-realistic representations of furnishings present in the physical room, as well as photo-realistic representations of controllable devices within the physical room, such as a hanging lamp 320 and table lamps 330, 340. Each of these devices provides a service having states (e.g., an active state, an inactive state, and some cases a plurality of active sub-states), similar to as described above.

Initially when the virtual room is loaded (e.g., by default), the representation of the hanging lamp 320 is selected from a sequence of representations of devices. An indication (e.g., a text label) 350 is shown that the hanging lamp 320 is selected. Also shown is a designated control region (e.g., slider) 360 that is separate from the representation of the hanging lamp 320. A user may provide touch input in the designated control region 360 (e.g., drag the slider) to change the state of a lighting service provided by the hanging lamp.

Figure 4:
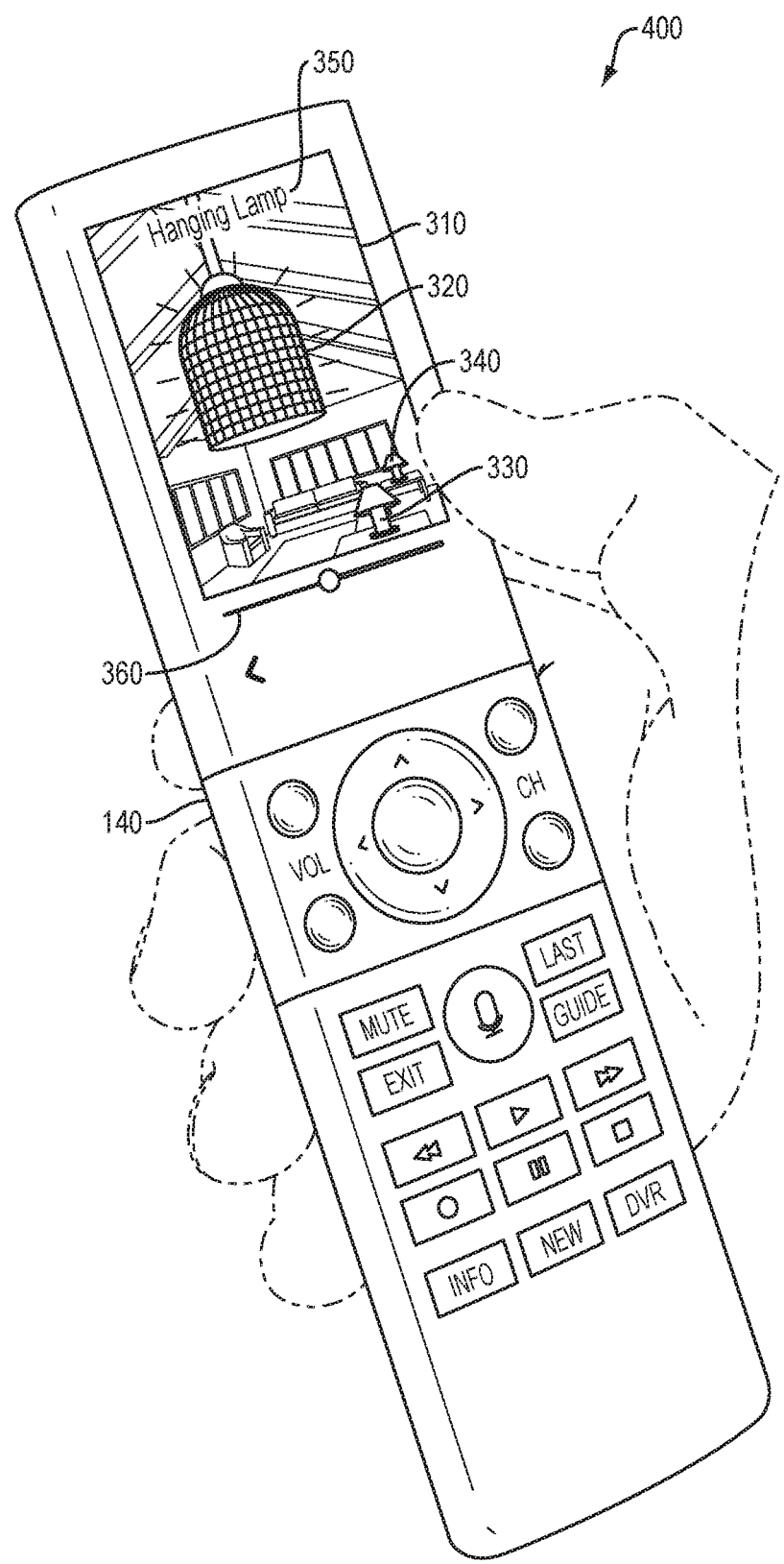
FIG. 4 is an updated view of the example remote control and virtual room of FIG. 3, after a user has provided touch input in the designated control region (e.g., dragged the slider), here to change the state of a lighting service provided by the hanging lamp.

FIG. 4 is an updated view 400 of the example remote control 140 and virtual room 310 of FIG. 3, after a user has provided touch input in the designated control region (e.g., dragged the slider), here to change the state of a lighting service provided by the hanging lamp. As can be seen, the appearance of the virtual room is dynamically updated to show the representation of the hanging lamp 320 providing less illumination, and the effects of such decreased illumination is shown on the representations of boundaries and the representations of furnishings. After the lighting service provided by the hanging lamp has been adjusted, the user may advance with touch input (e.g., a forward swipe) to select a successive representation in the sequence, here the representation of table lamps 330, 340.

Figure 5:
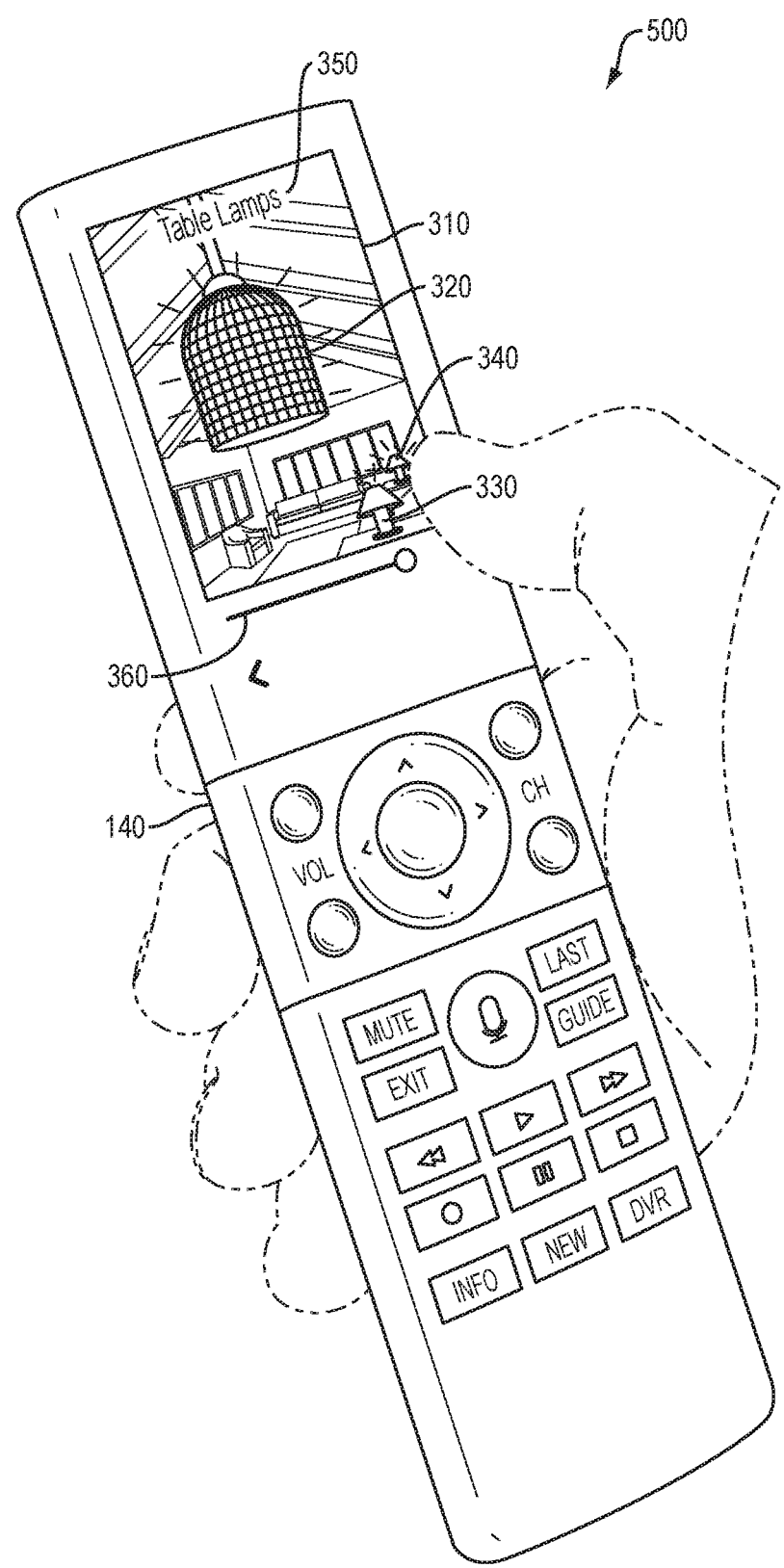
FIG. 5 is an updated view of the example remote control and virtual room of FIG. 3, after a user has selected a successive representation in the sequence, here a representation of table lamps.

FIG. 5 is an updated view 500 of the example remote control 140 and virtual room 310 of FIG. 3, after a user has selected a successive representation in the sequence, here the representation of table lamps 330, 340. Again, using the designated control region (e.g., slider) 360 that is separate from the representation of table lamps 330, 340, the user may change the state of a lighting service, and the appearance of the virtual room is dynamically updated.

Figure 6:
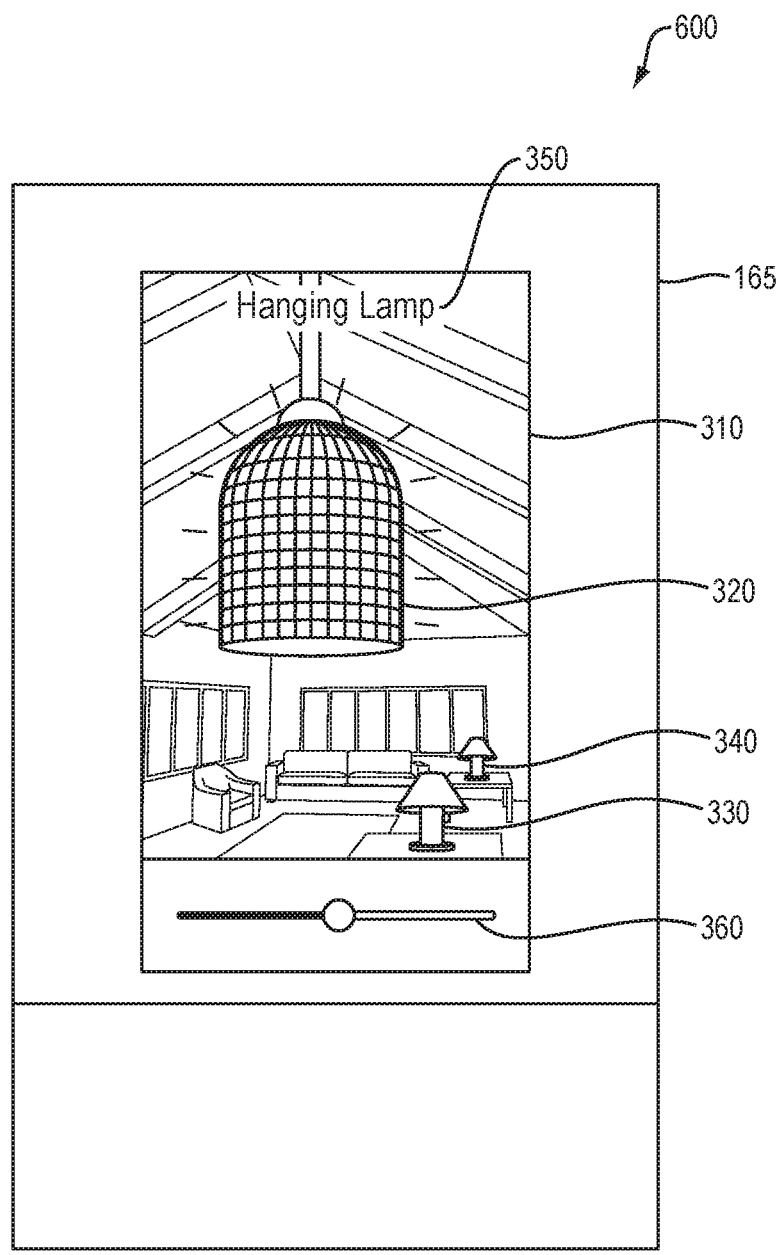
FIG. 6 is a view of an example dedicated touch screen unit (here, a wall-mounted unit) showing on a touch screen display thereof the same example virtual room of a virtual room user interface as shown in FIG. 3.

FIG. 6 is a view 600 of an example dedicated touch screen unit (here, a wall-mounted unit) showing on a touch screen display thereof the same example virtual room 310 of a virtual room user interface as shown in FIG. 3. The example virtual room 310 on the dedicated touch screen unit may be used to control devices in the physical room, as described above.

In summary, a virtual room-based user interface suited for use on a "small screen" is provided that organizes representations of devices in a virtual room into a sequence, allows a user to cycle through the representations of devices in the sequence so only a single one is selected at any given time, and individually control the device corresponding to a selected representation using a designated control region separate from the selected representation of the device. While the above description provides certain specific examples, it should be apparent that a number of modifications and/or additions may be made thereto. Additionally, it should be understood that the steps described above may be implemented in hardware, software (embodied as a non-transitory electronic device-readable medium including software), firmware, or a combination thereof. A non-transitory electronic device-readable medium may take the form of a memory, such as a Random Access Memory (RAM), a disk, such as a hard drive or flash device, or other tangible storage medium. In general, it should be understood that the above descriptions are meant to be taken only by way of example.

What is claimed is:

1. A method for providing a virtual room-based user interface to control devices, comprising:
    displaying, by a control unit or mobile device, a view of a virtual room that corresponds to a physical room and that includes a representation of a first device present in the physical room and at least one of a portion of structure of the physical room or a portion of furnishings present in the physical room;
    receiving, by the control unit or mobile device, user input indicating a change of state in the physical room; and
    in response to the user input,
        causing a change to a state provided by the first device, and
        dynamically updating appearance of the virtual room to change appearance of the representation of the first device and at least one of the portion of the structure of the physical room or the portion of the furnishings present in the physical room to reflect the change to the state, wherein the appearance of the virtual room is produced based on one or more prerecorded images of the physical room.

2. The method of claim 1, wherein the user input includes a selection upon the representation of the first device in the virtual room.

3. The method of claim 1, wherein the user input includes a selection in a designated control region separate from the representation of the first device in the virtual room.

4. The method of claim 1, wherein the representation of the first device, the portion of the structure of the physical room and the portion of furnishings present in the physical room are each a photo-realistic representation.

5. The method of claim 1, wherein the first device is a lighting device, the state provided by the first device includes an illumination level, and the change to the state is a change to the illumination level.

6. The method of claim 1, wherein the first device is a lighting device, the state provided by the first device includes an illumination color, and the change to the state is a change to the illumination color.

7. The method of claim 1, wherein the first device is an audio/video (A/V) device, the state provided by the first device includes an activation state, and the change to the state is a change to the activation state.

8. The method of claim 1, wherein the first device is an audio/video (A/V) device, the state provided by the first device includes a video source or channel, and the change to the state is a change to the video source or channel.

9. The method of claim 1, wherein the one or more prerecorded images are a plurality of images of the physical room captured by a camera showing the room in differing states.

10. A home automation system having a virtual room-based user interface to control devices, comprising:
 a control unit or mobile device configured to display on a touch sensitive screen a view of a virtual room that corresponds to a physical room and that includes a representation of a first device present in the physical room and at least one of a portion of structure of the physical room or a portion of furnishings present in the physical room, wherein the control unit or mobile device is further configured to receive on the touch sensitive screen user input indicating a change of state in the physical room; and
 a controller in communication with the control unit or mobile device and operable to control devices of the home automation system, the controller configured to, in response to the user input, cause a change to a state provided by the first device,
 wherein the control unit or mobile device is further configured to dynamically update appearance of the virtual room to change appearance of the representation of is the first device and at least one of the portion of the structure of the physical room or the portion of furnishings present in the physical room to reflect the change to the state, wherein the appearance of the virtual room is produced based on one or more prerecorded images of the physical room.

11. The home automation system of claim 10, wherein the user input includes a touch upon the representation of the first device in the virtual room.

12. The home automation system of claim 10, wherein the user input includes a touch in a designated control region separate from the representation of the first device in the virtual room.

13. The home automation system of claim 10, wherein the representation of the first device, the portion of the structure of the physical room and the portion of the furnishings present in the physical room are each a photo-realistic representation.

14. The home automation system of claim 10, wherein the one or more prerecorded images are a plurality of images of the physical room captured by a camera showing the room in differing states.

15. A non-transitory electronic device readable medium having software encoded thereon, the software, when executed on one or more processors of one or more electronic devices, operable to:
 display a view of a virtual room that corresponds to a physical room and that includes a photo-realistic representation of a first device present in the physical room and at least one of a portion of structure of the physical room or a portion of furnishings present in the physical room;
 receive user input indicating a change of state in the physical room; and
 in response to the user input, dynamically update appearance of the virtual room to change appearance of the photo-realistic representation of the first device and at least one of the portion of the structure of the physical room or the portion of furnishings present in the physical room to reflect the change of the state.

16. The non-transitory electronic device readable medium of claim 15, wherein the software, when executed, is further operable to:
 in response to the user input, cause a change to a state provided by the first device.

17. The non-transitory electronic device readable medium of claim 15, wherein the user input includes a selection upon the representation of the first device in the virtual room.

18. The non-transitory electronic device readable medium of claim 15, wherein the user input includes a selection in a designated control region separate from the representation of the first device in the virtual room.

19. The non-transitory electronic device readable medium of claim 15, wherein the representation of the first device, the portion of the structure of the physical room and the portion of the furnishings present in the physical room are each a photo-realistic representation.

20. The non-transitory electronic device readable medium of claim 15, wherein the appearance of the virtual room is produced based on a plurality of images of the physical room captured by a camera showing the room in differing states.

* * * * *

UNITED STATES PATENT AND TRADEMARK OFFICE
CERTIFICATE OF CORRECTION

PATENT NO. : 10,802,668 B2
APPLICATION NO. : 16/821626
DATED : October 13, 2020
INVENTOR(S) : Robert P. Madonna et al.

Page 1 of 1

It is certified that error appears in the above-identified patent and that said Letters Patent is hereby corrected as shown below:

In the Specification
Column 6, Line 65 reads:
"within the virtual room corresponding to the de-vice's actual"
Should read:
--within the virtual room corresponding to the device's actual--

In the Claims
Column 11, Line 28 reads:
"of is the first device and at least one of the portion of"
Should read:
--of the first device and at least one of the portion of--

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*